(12) United States Patent
Maffeis

(10) Patent No.: US 9,163,766 B2
(45) Date of Patent: Oct. 20, 2015

(54) DEVICE FOR CONNECTING PNEUMATIC TOOLS TO A MANIPULATOR

(71) Applicant: GIMATIC S.p.A., Roncadelle (BS) (IT)

(72) Inventor: Giuseppe Maffeis, Roncadelle (IT)

(73) Assignee: GIMATIC S.P.A., Roncadelle (BS) (IT)

( * ) Notice: Subject to any disclaimer, the term of this patent is extended or adjusted under 35 U.S.C. 154(b) by 190 days.

(21) Appl. No.: 14/048,278

(22) Filed: Oct. 8, 2013

(65) Prior Publication Data

US 2014/0102547 A1    Apr. 17, 2014

(30) Foreign Application Priority Data

Oct. 11, 2012   (IT) ............................... BS2012A0145

(51) Int. Cl.
    *F16L 39/00*          (2006.01)
    *F16L 37/56*          (2006.01)
    *B25J 15/04*          (2006.01)
    *B25J 19/00*          (2006.01)

(52) U.S. Cl.
CPC ................. *F16L 39/00* (2013.01); *B25J 15/04* (2013.01); *B25J 19/0029* (2013.01); *F16L 37/56* (2013.01); *Y10T 137/0447* (2013.01); *Y10T 137/87161* (2013.01)

(58) Field of Classification Search
CPC .......... B25J 19/0029; B25J 15/04; B25J 9/14; B25J 15/0408; B25J 15/0425; B25J 15/0491; F16L 39/00; F16L 37/56; Y10T 137/87153; Y10T 137/87161; Y10T 137/0447
USPC ....................... 137/594–595; 251/149–149.9; 74/490.01; 901/41, 22, 37; 285/124.1–124.5
See application file for complete search history.

(56) References Cited

U.S. PATENT DOCUMENTS

| | | | | |
|---|---|---|---|---|
| 2,399,525 | A | * | 4/1946 | Waag .............................. 137/595 |
| 4,409,464 | A | * | 10/1983 | Favareto et al. .............. 219/136 |
| 4,604,787 | A | * | 8/1986 | Silvers, Jr. ...................... 483/55 |
| 4,737,611 | A | * | 4/1988 | Humblot .................... 219/86.25 |
| 4,809,747 | A | * | 3/1989 | Choly et al. ............. 137/614.06 |
| 4,886,467 | A | * | 12/1989 | Peveto .......................... 439/192 |
| 5,018,266 | A | * | 5/1991 | Hutchinson et al. ............. 483/1 |
| 5,782,571 | A | * | 7/1998 | Hufford et al. ................. 403/31 |
| 6,073,512 | A | * | 6/2000 | McCormick et al. ........... 74/528 |
| 6,569,070 | B1 | * | 5/2003 | Harrington et al. .............. 483/1 |
| 7,374,524 | B2 | * | 5/2008 | McCormick ...................... 483/4 |

(Continued)

OTHER PUBLICATIONS

Gimatic S.P.A.: "Quick Changer", Oct. 1, 2010, pp. 60-69; XP55060600.

*Primary Examiner* — Craig Schneider
*Assistant Examiner* — David Colon Morales
(74) *Attorney, Agent, or Firm* — Volpe and Koenig, P.C.

(57) ABSTRACT

A device for connecting interchangeable pneumatic tools to manipulators is provided. The device includes a body, fixable to a manipulator, provided with a plurality of seats for accommodating pins for engaging a tool, ducts for feeding a working fluid to the tool, where the ducts extend in the device body, an engaging mechanism which can be activated for constraining and releasing, respectively, the tool to/from the device, and means for closing the ducts. For safety purposes the device is arranged such that the activation of the engaging mechanism for unlocking the tool is always achievable upon the reaching of the complete closing of the ducts by the respective closing means. This way a quick depressurization of the tool is prevented from occurring at the separation from the device, this latter circumstance being conventionally dangerous for the tool replacement operator.

13 Claims, 3 Drawing Sheets

(56) References Cited

U.S. PATENT DOCUMENTS

| | | | |
|---|---|---|---|
| 7,779,716 B2* | 8/2010 | Dellach et al. | 74/490.02 |
| 2007/0228671 A1* | 10/2007 | Norton | 279/2.11 |
| 2008/0042432 A1 | 2/2008 | Park et al. | |
| 2009/0322041 A1* | 12/2009 | Norton | 279/2.11 |
| 2010/0059943 A1* | 3/2010 | Norton et al. | 279/72 |
| 2010/0062919 A1* | 3/2010 | Norton et al. | 483/55 |
| 2010/0090458 A1* | 4/2010 | Schulz et al. | 285/26 |

* cited by examiner

DEVICE FOR CONNECTING PNEUMATIC TOOLS TO A MANIPULATOR

FIELD OF THE INVENTION

The present invention refers to a device for connecting pneumatic tools to a corresponding robotic manipulator.

BACKGROUND

In the field of the industrial automation the use of robotic manipulators, for example motorized articulated arms, is known, to which tools intended to operate on pieces to be manipulated or processed can be combined. As appropriate the tool can therefore be a clamp, pincers, or punch etc., for gripping the objects to be manipulated.

In many cases the manipulators are designed to mount interchangeable tools. In this circumstance connecting devices are generally used for operatively connecting the tools to the respective manipulator.

Generally the connecting devices at present available comprise a body intended to be permanently fixed to the manipulator, for example by means of screws. The device body comprises in its turn a plurality of seats for housing corresponding coupling portions of the tool, for example holes for housing pins or clutches of the tool. The device further comprises a mechanism for engaging the coupling portions of the tool; such a mechanism is movable between a locking position, at which the coupling portions of the tool are locked in their respective seats of the body without the possibility of disengaging, and an unlocking position, at which the coupling portions of the tool are free to be taken out of the respective seats.

In practice the connecting device is fixed to the manipulator and the tool can be removably coupled to the device body.

When expected, based on the typology of tool to be used, the operative connection that the connecting devices have to put into action further comprises the electrical, pneumatic, hydraulic connections, etc., for the supply of the tool.

Besides providing the correct and practical tool-manipulator coupling, the connecting devices have to allow a tool replacement as quick and riskless as possible for the personnel of the working station which comprises the manipulator.

For example, in the field of molding plastic components, manipulators are used for gripping, handling and repositioning the pieces and/or the molds or parts thereof. The interchangeable tools combined with manipulators mostly consist of pneumatically operated clamps.

A typical connecting device widely used in this field and others, and which defines de facto a standard with which the manufacturers comply, comprises a substantially toroidal body, fixed to the manipulator, provided with seats for housing corresponding engaging pins provided on a plate fixed to the tools. The seats are arranged circumferentially around the body axis. In radially inner position with respect to the housing seats, the body comprises a plurality of ducts for feeding compressed air used for activating each time the tools constrained to the device; usually along such ducts automatic valves for opening and closing the ducts themselves are installed. The mechanism for engaging the pins of the tool is a circular ring nut provided with through openings each one consisting in a substantially circular hole joined to an eyelet whose length is lower than the diameter of the circular hole. The ring nut is coaxial to the body and is superimposed thereto such that every through openings intercept a corresponding housing seat. The ring nut is manually rotatable by the operator between a first angular unlocking position, at which the circular holes are aligned to the accommodating seats and the pins of the tool can be inserted or taken out from the respective seats for constraining or disengaging, respectively, the tool from the device, and a second angular locking position, at which the eyelets are aligned with the accommodating seats and lock the pins of the tool at their section with reduced diameter, so as to prevent the tool from disengaging from the connecting device.

In practice when a tool needs to be replaced, the operator acts on the engaging mechanism, that is to say he rotates the ring nut to move the respective holes into alignment to the seats for accommodating the pins of the tool mounted on the device. In this way the tool can be separated from the device and, therefore, from the manipulator, in order to make room for the new tool. The automatic valves are hold opened by the tool pressing against them while remaining constrained to the connecting device. When the tool is physically separated from the device, the automatic valves are operated to close the feeding of compressed air in the respective ducts.

A relevant drawback of the described connecting devices consists in that the automatic valves act too late in closing the feeding of compressed air when the tool is separated from the device. In practice, also when the ring nut is moved by the operator to the locking position, in order to release the tool, the compressed air is still fed and it is enough to keep operative the tool itself, for example it is enough to hold opened the jaws of a pneumatic clamp. Only after the tool has been separated from the device, the residual compressed air in the tool inevitably is discharged in the atmosphere and this usually causes the tool deactivation. Referring again to the example of the pneumatic clamp, the jaws close abruptly, with evident risks for the safety of the operator handling the tool.

Some tools can also severely hurt the operators and therefore it has been long felt the need of providing connecting devices which prevent the tools from abruptly deactivating when they are removed.

The same drawback can be found also in the event the tool is activated by means of pneumatic vacuum, rather than compressed air. In this case the separation of the tool from the connecting device corresponds to the immediate pressure recovery of the tool itself and the immediate deactivation thereof.

For illustration purposes, a set of connecting devices according to the known art is commercialized by the Applicant under the name of "automatic tool-replacer for QC-Series robot" (in Italian "cambia-utensile automatico per robot QC-Series").

SUMMARY

An object of the present invention is to provide a device for connecting pneumatic tools to manipulators which overcomes the drawbacks of known solutions, resulting easy to implement and use and safe for the operators.

Therefore the present invention relates to a connecting device according to claim 1.

Particularly, the device according to the present invention comprises:
a) a body, fixable to a manipulator, provided with one or more seats for accommodating corresponding coupling portions of a tool, for example holes for accommodating corresponding engaging pins of the tool;
b) one or more ducts for feeding or suctioning a working fluid to/from the tool, for example compressed air or vacuum, wherein the ducts cross at least partially the device body;

c) a mechanism for engaging the coupling portions of the tool, wherein the engaging mechanism can be activated to lock and unlock, respectively, the coupling portions of the tool in/from the corresponding seats for accommodating the body of the device;

d) means for closing the feeding/suctioning ducts, mounted in the body or on the body of the device, wherein said closing means are designed to automatically close the feeding/suctioning ducts before the engaging mechanism, once activated, unlocks the tool from the device.

The closing means are independent from the tool, meaning that the activation of the closing means does not necessarily depend on whether the tool is present on the device or not.

The working fluid is preferably compressed air, but alternatively it can also be oil, the pneumatic vacuum, etc.

The above mentioned characteristic d) is highly significant for safety purposes on workplaces, since it allows the operator in charge for the replacement of the tools each time combined to the device to be prevented from injuring. Since the closing means are always activated correctly in advance with respect to the engaging mechanism which moves to the unlocking position of the tool, that quick decompression (in the event the working fluid is compressed air) or pressurization (in the event the tool is activated with the pneumatic vacuum) of the tool is avoided which usually occurs at the separation from the conventional connecting devices.

In other words the presence of closing means activated by the engaging mechanism, automatically when the engaging mechanism is moved to unlocking position, allows to prevent the undesired activation or deactivation of the tool when it is separated from the connecting tool for the replacement with another tool. The advantages for the operator safety are evident.

The closing means act as a tap which, if necessary, stops the flow rate of the working fluid, fed or suctioned, upstream of the tool.

Referring again for sake of simplicity to the previously mentioned example wherein the connecting devices are used to support pneumatic clamps, the closing means of the feeding ducts can be activated to stop the feeding of compressed air before the clamp is separated from the device itself. This prevents the build up of compressed air in the tool before the same is effectively separated from the device. The result is that the tool does not depressurize abruptly and therefore the jaws do not abruptly close, or open (as appropriate), when the operator handles the clamp.

Another important advantage is given by the fact that the characteristic d) can be implemented in known connecting devices. In other words the existing devices already installed on the manipulators can be modified, by integrating them with the components needed for implementing the characteristic d). As it will be better described referring to the attached figures, the characteristic d) can be implemented by providing few additional components to the standard connecting devices of the above described type relating to the known art, without the respective overall replacement being needed, with evident economic benefits for the user.

The activation of the engaging mechanism is kinematically achievable upon the activation of the closing means, meaning that these components are designed to interact such that the closing means operate for closing the feeding of the working fluid before the tool can be disconnected from the device.

In an optional embodiment the device according to the present invention is also provided, in addition to the above mentioned closing means, with one or more automatic valves of the type used in known devices, housed at least partially in the device body, each one intercepting a corresponding feeding/suctioning duct. In this embodiment the automatic valves are completely independent from the closing means and these latter are provided upstream of the automatic valves with respect to the feeding direction of the working fluid.

In general, differently from the automatic valves used in the known art, the closing means provided in the device according to the present invention are not activated by the tool.

In general, however, the device according to the present invention can do without the automatic valves used in the devices of known art.

Preferably the engaging mechanism is movable between a first unlocking position, at which the coupling portions of the tool are free to engage and disengage the corresponding accommodating seats in the device body, so as to allow the tool replacement, and a second locking position, at which the engaging mechanism holds the coupling portions of the tool as locked in the corresponding accommodating seats in the device body, so as to prevent the tool from separating from the respective manipulator. In general the engaging mechanism can be manual, that is to say driven by operator control, for example by means of a corresponding lever, or rather automatic, that is to say driven by robotic-station control of the respective manipulator.

The closing means too can be designed to be manually or automatically activated, as appropriate.

In the preferred embodiment, the engaging mechanism is designed to automatically, and in advance, activate the closing means when the engaging mechanism itself is in its turn activated. For example the engaging mechanism is provided with a portion, a lever, etc., which moves the closing means to activate.

Preferably the closing means comprise, for each feeding/suctioning duct, a gate valve movable between a completely opened position and a completely closed position of the respective feeding/suctioning duct. In practice it is preferable to provide a single gate valve which intercepts all the feeding ducts and which can be brought to the closing position of the ducts before the engaging mechanism releases the tool from the mechanical constraint with the device.

In an embodiment the device body comprises a first plate, intended to be fixed to a manipulator, and a second plate, intended to support the tool. The first plate and the second plate are fixed one to another and the ducts for feeding/suctioning the working fluid develop partially through the first plate and partially through the second plate. The closing means of the ducts are interposed between the first plate and the second plate.

Preferably the first plate and the second plate are substantially circular and coaxial with respect to a longitudinal axis X-X, which corresponds to the axis for coupling with the tools. The ducts for feeding/suctioning the working fluid develop at least partially in parallel to the longitudinal axis X-X and have a circular distribution around such an axis. The closing means comprise at least a third plate, interposed between the first plate and the second plate, provided with a plurality of through holes, each one corresponding to one of the ducts for feeding/suctioning the working fluid. The third plate is rotatable on the longitudinal axis X-X between:
   a first opening position, at which the holes are aligned to the corresponding ducts for feeding/suctioning the working fluid, which therefore remain opened, and
   a second closing position, at which the holes are misaligned with respect to the corresponding ducts for feeding/suctioning the working fluid, which therefore remain closed by the third plate, which acts as gate valve.

The just described embodiment substantially comprises a plate, defined as third plate, inserted in the device body in such a position to allow to intercept, in a certain angular position, the feeding ducts (upstream of the automatic valves, if present, with respect to the direction for feeding/suctioning the working fluid).

Preferably the engaging mechanism is arranged to push the third plate towards the respective closing position when the engaging mechanism itself is activated to release the tool from the device.

Preferably the closing means further comprise sealing gaskets interposed between the first plate and the third plate, and between the second plate and the third plate, at the ducts for feeding/suctioning the working fluid. Such gaskets are necessary for guaranteeing the sealing against leaks of working fluid or vacuum at the interface between the third plate and the feeding/suctioning ducts.

Preferably the third plate is provided with a handle for the respective manual activation by the tool replacement operator and as a stop to limit the rotation between the closing position and the opening position only. For example the stops can be obtained by prearranging an inner cam in the third plate and a corresponding follower, or non-kickback finger, on the first or the second plate.

Preferably the closing means comprise a coaxial ring nut which is superimposed on the second plate. The ring nut is provided, for each of the accommodating seats provided in the device body, with through openings each one consisting of a substantially circular hole joined to an eyelet whose width is smaller than the diameter of the circular hole. In each hole of the ring nut a corresponding coupling pin of the tool can be inserted, which conversely cannot be inserted through the eyelet. The ring nut is rotatable between:

- an unlocking position, at which the respective holes are aligned to the accommodating seats and the engaging pins of the tool can be inserted/released to respectively engage and release the tool to/from the device, and
- a locking position, at which the eyelets are aligned to the accommodating seats to engage a narrowing section of the coupling pins of the tool and to lock them just into the accommodating seats, so as to prevent the tool from disengaging from the device.

More preferably the ring nut is provided with an activation lever and the third plate is provided with a safety pin intended for coming into abutment against the activation lever of the ring nut to drive the advanced activation of the third plate when the ring nut is rotated to unlock the tool. In the event the operator should push the ring nut before closing the feeding of the working fluid to the tool by rotating the third plate, the safety pin comes into abutment against the third plate itself and drives the rotation thereof towards the respective closing position before the ring nut reaches the respective unlocking position.

In its second aspect the present invention relates to a method for operatively connecting a pneumatic tool to a manipulator. The method is intended to provide the manipulator with a connecting device in its turn provided with the above mentioned characteristics a)-d) and to arrange the device such that the engaging mechanism can be brought to the respective unlocking position of the tool only after the closing means have closed the feeding/suctioning ducts.

BRIEF DESCRIPTION OF THE DRAWINGS

Further characteristics and advantages of the present invention will be more evident from a review of the following specification of a preferred, but not exclusive, embodiment, shown for illustration purposes only and without limitation, with the aid of the attached drawings, in which.

DETAILED DESCRIPTION OF THE PREFERRED EMBODIMENTS

Figure 1:
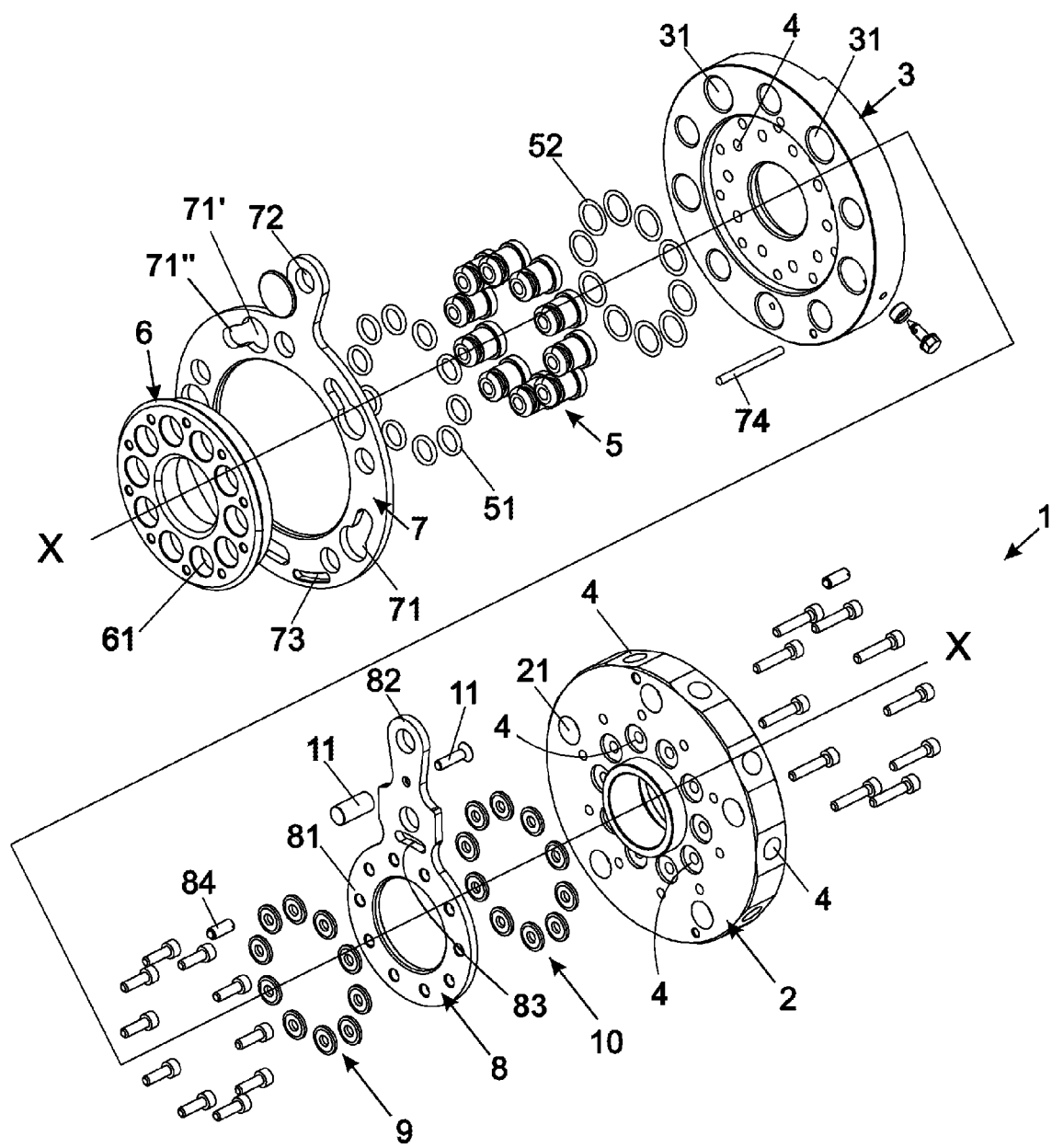
FIG. 1 is an exploded view of an embodiment of the connecting device according to the present invention.

Attached FIGS. 1-6 show the preferred embodiment of the present invention, which relates to a device 1 for connecting tools (not shown) to a manipulator (not shown). The device 1 has the function of allowing interchangeable tools to be mounted on the manipulator, and allowing the quick and safe tool replacement.

A first toroidal plate 2 is screwed to a second toroidal plate 3. The two plates 2 and 3 are steady and form the body C of the device and are coaxial with respect to the longitudinal axis X-X. Such an axis is also the alignment axis of the tool to the device 1. The first plate 2, hereinafter defined as rear plate, is intended to be fixed to a manipulator, for example a robotic arm; the second plate 3, hereinafter defined as a front plate, is intended to support the interchangeable tools, meaning that the tools are anchored to the front plate 3 from time to time.

At least the front plate 3 is provided with a plurality of through or blind holes 31, in which corresponding coupling pins of the tool are intended to be slidingly inserted. The holes 31 are arranged with circular shape around the axis X-X. In case, the holes 31 continue into the rear plate 2 (reference 21).

The rear plate is provided with a plurality of ducts 4 extending for an initial length in radial direction, that is to say orthogonally with respect to the axis X-X, then they extend axially, that is to say in parallel to and around the axis X-X; the ducts 4 themselves axially continue through the front plate 3. The extension of the ducts 4 through the body C of the device, that is to say through the plates 2 and 3, is clearly visible in FIG. 6.

The ducts 4 have the function of conveying the working fluid to the tool supported by the front plate 3. Hereinafter for sake of convenience, compressed air will be referenced to, still taking into account that the working fluid can be different in nature, or also the pneumatic vacuum, or rather suctioned air.

The arrows in FIG. 1 denote the feeding direction of the compressed air.

In the embodiment shown in figures, at the outlet of the ducts 4 corresponding nozzles 5 are arranged and provided with sealing gaskets 51 and 52, and a nozzle-holder insert 6 provided with holes 61 in which the nozzles 5 are partially inserted. The latter is fixed to the front plate 3 so that the holes 61 are aligned to the nozzles 5 and the ducts 4 for feeding the compressed air; the nozzles 5 are countered by springs and can be activated to cause the opening and closing of the respective ducts 4 for feeding the compressed air.

In practice the nozzles 5 and the nozzle-holder insert 6 together define automatic valves for closing the ducts 4.

When the device 1 is not in use, that is to say it does not support a tool, the nozzles 5 close the corresponding holes 61 provided in the nozzle-holder insert 6, choking the ducts 4 which can not feed compressed air to the tool.

When a tool is frontally coupled to the device 1, the nozzles 5 let the ducts 4 opened for feeding compressed air.

In general the automatic valves (nozzles+nozzle holders) can be not provided, since become useless because of the closing means of the ducts 4 described hereinafter.

On the front plate 3 a circular ring nut 7 is accommodated provided with a plurality of through openings 71 and a control lever 72. Each of the through openings 71 correspond to one of the holes 31 for accommodating the tool pins. The shape of the openings 71 corresponds to a circular hole 71' joined to an eyelet 71" whose width is lower than the diameter of the hole 71'. The tool pins are dimensioned to be inserted through the hole 71' but not through the eyelet 71".

The ring nut 7 is coaxial to the front plate 3 and is rotatable with respect to the latter between:
- an unlocking position, at which the tool pins can be freely inserted and released in the holes 31 through the holes 71, and
- a locking position, at which the holes 71 are angularly misaligned with respect to the holes 31 which conversely remain intercepted by the eyelets 71" and the eyelets 71" tighten a narrowing section of the engaging pins of the tool, locking the same in the holes 31.

Figure 2:
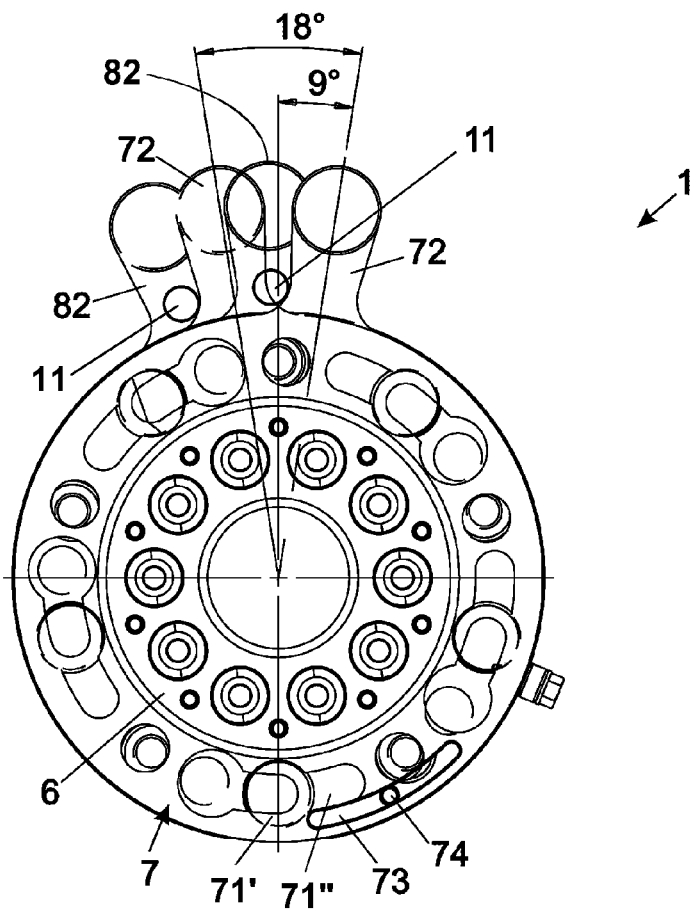
FIG. 2 is a front view of the device shown in FIG. 1.

As better shown in FIG. 2, the locking and unlocking positions of the tool define a central angle of about 18°.

The ring nut 7 comprises a cam 73 which interacts with the pawl 74 fixed to the front plate 3. The cam 73 and the pawl 74 constitute the stops which define the end angular positions of the ring nut 7.

Therefore the ring nut 7 defines an engaging mechanism of the tool pins.

FIG. 2 shows a front view of the device 1 and in particular it shows with a solid line the ring nut 7 in the locking angular position and with a broken line the ring nut 7 in the unlocking angular position.

In the shown embodiment, the rotation of the ring nut 7 is manually imparted by the operator by means of the lever 72.

The front plate 3, together with the nozzles 5, the nozzle holder 6, the gaskets 51, 52 and together with the ring nut 7, define a first portion A of the device 1.

The portion A is known in the art; for example it is equivalent to the corresponding portion of the devices commercialized by the Applicant under the QC-series code.

The connecting device 1 further comprises a third plate 8, interposed between the rear plate 2 and the front plate 3, whose function is to close and open the ducts 4 for feeding compressed air, acting as a gate valve.

The third plate 8 and the rear plate 2 define a second portion B, new and inventive with respect to the known art, which can be possibly added later to the pre-existing devices 1 arranged as the only portion A.

The third plate 8 is provided with through holes 81, corresponding in number at least to the number of ducts 4 for feeding compressed air. The third plate 8 is mounted coaxial with respect to the plates 2 and 3, in intermediate position between these latter, and can be rotated between:
- a first opening position, at which the holes 81 are aligned with the ducts 4 for compressed air, which therefore remain opened to allow air flow to the tool constrained to the device 1; and
- a second closing position, at which the holes 81 are misaligned with respect to the ducts 4 for compressed air, which therefore remain closed to prevent the air from being fed to the tool constrained to the device 1.

Figure 3:
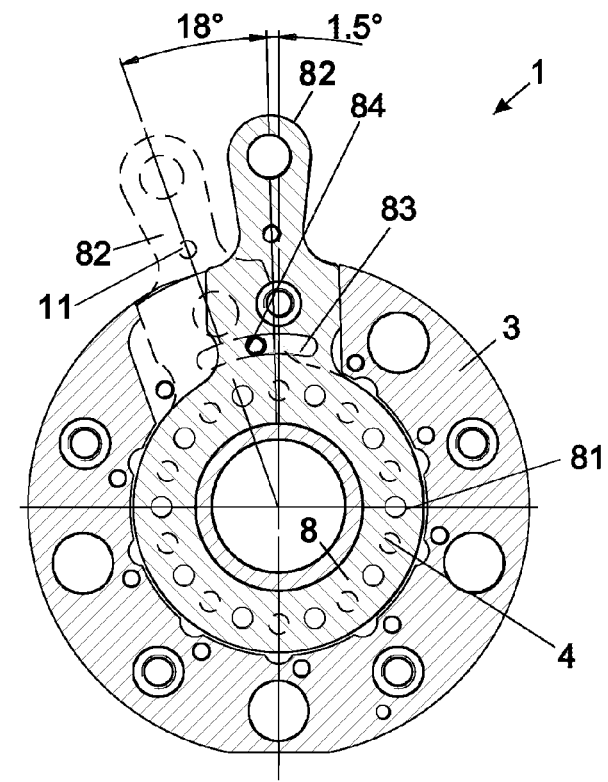
FIG. 3 is a cross sectional view of the device shown in FIG. 1.

As better shown in FIG. 3, the opening and closing positions define a central angle of about 18°.

Figure 5:
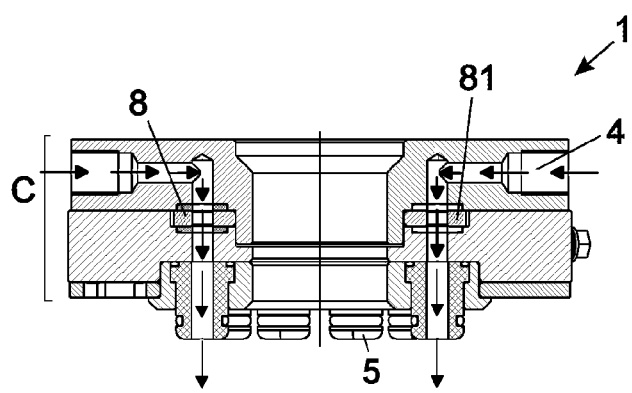
FIG. 5 is a longitudinal section view of the device shown in FIG. 1, in a first arrangement.

FIG. 5 shows a longitudinal section of the device 1 in an arrangement wherein the third plate 8 is rotated in an opening position and the compressed air flows into the ducts 4.

Figure 6:
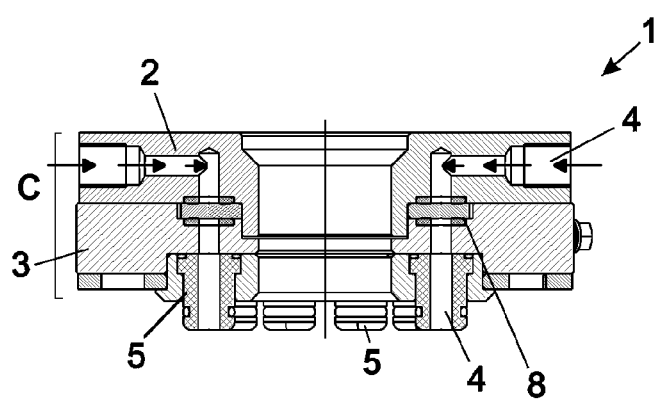
FIG. 6 is a longitudinal section view of the device shown in FIG. 1, in a second arrangement.

FIGS. 3 and 6 respectively show a longitudinal section and a cross section of the device 1 in an arrangement wherein the third plate 8 is rotated in closing position. The plate 8 itself closes the ducts 4 and prevents the flow of compressed air in the ducts 4.

In particular, in FIG. 3 it is evident that in the closing position the plate 8 closes the ducts 4 (broken line).

In practice the third plate 8 defines the closing means and intercepts the ducts 4 upstream of the front plate 3 with respect to the feeding direction of compressed air.

Sealing gaskets 9 and 10, on which the plate slides when rotated, are interposed between the ring nut 7 and the plates 2 and 3.

The stops of the third plate 8 are defined by the cam 83 and the pawl 84 fixed to one of the two plates 2 or 3.

The operation of the plate 8 is independent with respect to the automatic valves 5. The intervention of the plate 8 makes safe the disengagement of the tools constrained to the front plate 3, as it will be now described.

Before acting on the ring nut 7 to release the engaging pins of the tool from the front plate 3, the operator stops the feeding of compressed air to the tool itself, by rotating the third plate 8 to the closing position shown in FIGS. 3 and 6.

This determines the subsequent quick depressurization of the tool and its consequent deactivation, for example the deactivation of the jaws of a pneumatic clamp. At this point the operator rotates the ring nut 7 to the unlocking position (shown with a solid line in FIG. 2) to completely and safely separate the tool from the device 1.

In order to prevent errors of the operator, who could inadvertently release the tool before closing the feeding of compressed air, the third plate 8 is provided with a safety pin 11 fixed to the handle 82 in such a way to protrude towards the handle 72 of the ring nut 7.

Figure 4:
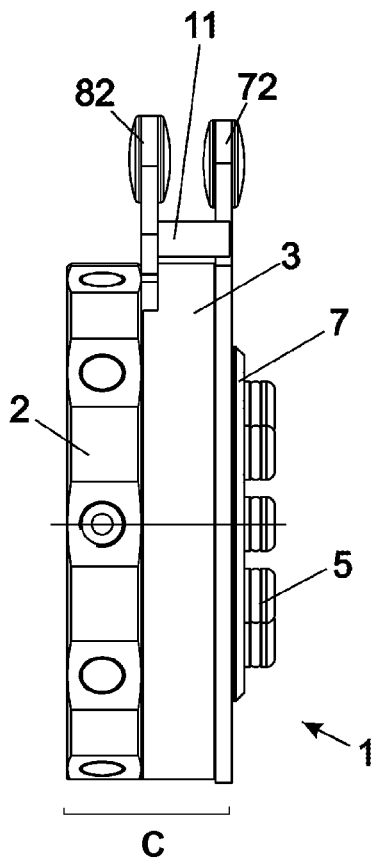
FIG. 4 is a side view of the device shown in FIG. 1.

The interaction between the handles 72 and 82 is evident from the inspection of FIGS. 3 and 4 and mostly from the inspection of FIG. 2. The safety pin 11 comes into abutment against the side of the lever 72 when the latter is rotated by the operator to the unlocking position of the tool. The angle of about 9° shown in FIG. 2 is hold, since the lever 72 pushes the safety pin 11 which in its turn drags the lever 82 of the plate 8. The result is that the plate 8 rotates in advance of about 9° with respect to the ring nut 7. This causes the plate 8 to close the ducts 4 before the ring nut 7 reaches the respective unlocking position.

In this way improper use of the device by the operator is prevented.

The invention claimed is:

1. A device (1) for connecting pneumatic tools to manipulators, comprising:
 a) a body (C), fixable to a manipulator, provided with one or more seats (31) for accommodating corresponding coupling portions of a tool;
 b) one or more ducts (4) for feeding or suctioning a working fluid to/from the tool, wherein the ducts (4) cross at least partially the body (C) of the device;
 c) a mechanism (7) for engaging the coupling portions of the tool, wherein the engaging mechanism (7) can be activated to lock and unlock, respectively, the coupling portions of the tool in/from the corresponding accommodating seats (31) of the device, and d) means (8-10) for closing the feeding/suctioning ducts (4) provided on/in the body (C) of the device, wherein the unlocking of the tool by means of the engaging mechanism (7) is achievable only upon closing of the feeding/suctioning ducts (4) by the closing means (8-10).

2. Device (1) according to claim 1, wherein the engaging mechanism (7) is movable between a first unlocking position, at which the coupling portions of the tool are free to engage and disengage the corresponding accommodating seats (31) into the body (C) of the device, so as to allow the tool replacement, and a second locking position, at which the engaging mechanism (7) holds the coupling portions of the tool locked in the corresponding accommodating seats (31) in the body (C) of the device, so as to prevent the detachment of the tool from the respective manipulator, and wherein in said unlocking position the closing means (8-10) close the ducts (4) to prevent the working fluid from feeding/suctioning to/from the tool.

3. Device (1) according to claim 1, wherein said closing means (8-10) are operable, manually or automatically, to stop the feeding/suctioning of the working fluid before the tool is separated from the device (1), and then to prevent a quick decompression or compression of the working fluid in the tool to occur because of the detachment.

4. Device (1) according to claim 1, wherein the engaging mechanism (7) comprises an element (11) for activating the closing means (8-10) designed for activating the closing means (8-10) automatically and in advance when the engaging mechanism (7) itself is in its turn activated.

5. Device (1) according to claim 1, wherein said closing means (8) comprise, for each feeding/suctioning duct, a gate valve movable between a completely opened position and a completely closed position of the respective feeding/suctioning duct (4).

6. Device (1) according to claim 5, wherein said closing means comprise at least one lever (82) for their activation and said engaging mechanism comprises at least one element (72) for pushing said lever (82).

7. Device (1) according to claim 1, wherein said body (C) comprises a first plate (2), intended for being fixed to a manipulator, and a second plate (3), intended for supporting the tool, wherein the first plate (2) and the second plate (3) are fixed one to another, and wherein each duct (4) for feeding/suctioning the working fluid extends partially through the first plate and partially through the second plate and the respective closing means are interposed between the first plate (2) and the second plate (3).

8. Device (1) according to claim 7, wherein the first plate (2) and the second plate (3) are substantially circular and coaxial with respect to a longitudinal axis X-X, the ducts (4) for feeding/suctioning the working fluid extend at least partially in parallel to the longitudinal axis X-X and have a circular distribution around said axis X-X, and wherein said closing means (8-10) comprise at least a third plate (8), interposed between the first plate (2) and the second plate (3), provided with a plurality of through holes (81), each corresponding to one of the ducts (4) for feeding/suctioning the working fluid, wherein the third plate (8) is rotatable on the longitudinal axis X-X between a first opening position, at which the respective holes (81) are aligned to the corresponding ducts (4) for feeding/suctioning the working fluid, which therefore remain open, and a second closing position, at which the holes (81) are misaligned with respect to the corresponding ducts (4) for feeding/suctioning the working fluid, which therefore remain closed by the third plate (8), the latter acting as a gate valve.

9. Device (1) according to claim 8, wherein the closing means further comprise sealing gaskets (9, 10) interposed between the first plate (2) and the third plate (8) at the ducts (4) for feeding/suctioning the working fluid, and between the second plate (3) and the third plate (8).

10. Device (1) according to claim 8, wherein the third plate (8) is provided with a handle (82) for the activation thereof and acting as a stop (83, 84) to limit the rotation between the closing position and the opening position only.

11. Device (1) according to claim 8, wherein said engaging mechanism comprises a ring nut (7) coaxial and superimposed to the second plate (3), wherein the ring nut (7) is provided, for each of said accommodating seats (31), with through openings (71) each consisting of a substantially circular hole (71') joined to an eyelet (71") whose width is lower than the diameter of the circular hole (71'), wherein each hole (71') of the ring nut (7) can be inserted in a corresponding coupling pin of the tool, and wherein the ring nut (7) can be rotated between an unlocking position, at which the respective holes (71') are aligned with the accommodating seats (31) and the engaging pins of the tool can be inserted and released to engage and disengage the tool to/from the device, and a locking position, at which the respective eyelets (71") are aligned with the accommodating seats (31) to engage a narrowing section of the coupling pins of the tool and to lock them just in the respective accommodating seats (31), to prevent the tool from disengaging from the device (1).

12. Device (1) according to claim 11, wherein said ring nut (7) is provided with a lever (72) for manually activating and pushing to activation the third plate (8), and wherein the third plate (8) is provided in its turn with a safety pin (11) intended for coming into abutment against the lever (72) of the ring nut (7) to drive the activation of the third plate (8) when the ring nut (7) is rotated to unlock the tool, in advance with respect to the ring nut (7) itself.

13. Method for operatively connecting a pneumatic tool to a manipulator, the method comprising the steps of:
  providing the manipulator with a connecting device, the connecting device comprising:
  a) a body (C), fixable to the manipulator;
  b) one or more ducts (4) for feeding or suctioning a working fluid to/from the tool, wherein the ducts (4) cross at least partially the body (C) of the device;
  c) an engaging mechanism (7) movable between an unlocking position, at which the tool can be separated from the device, and a locking position, at which the tool is locked to the device, and
  d) means (8-10) for closing the feeding/suctioning ducts (4),
  arranging the device so that the engaging mechanism (7) can be moved to the respective unlocking position only after the closing means (8-10) have closed the feeding/suctioning ducts (4).

\* \* \* \* \*